July 12, 1938.　　　G. RAYMOND　　　2,123,662
SAFETY PRESSURE DEVICE
Filed June 17, 1935　　　2 Sheets-Sheet 1
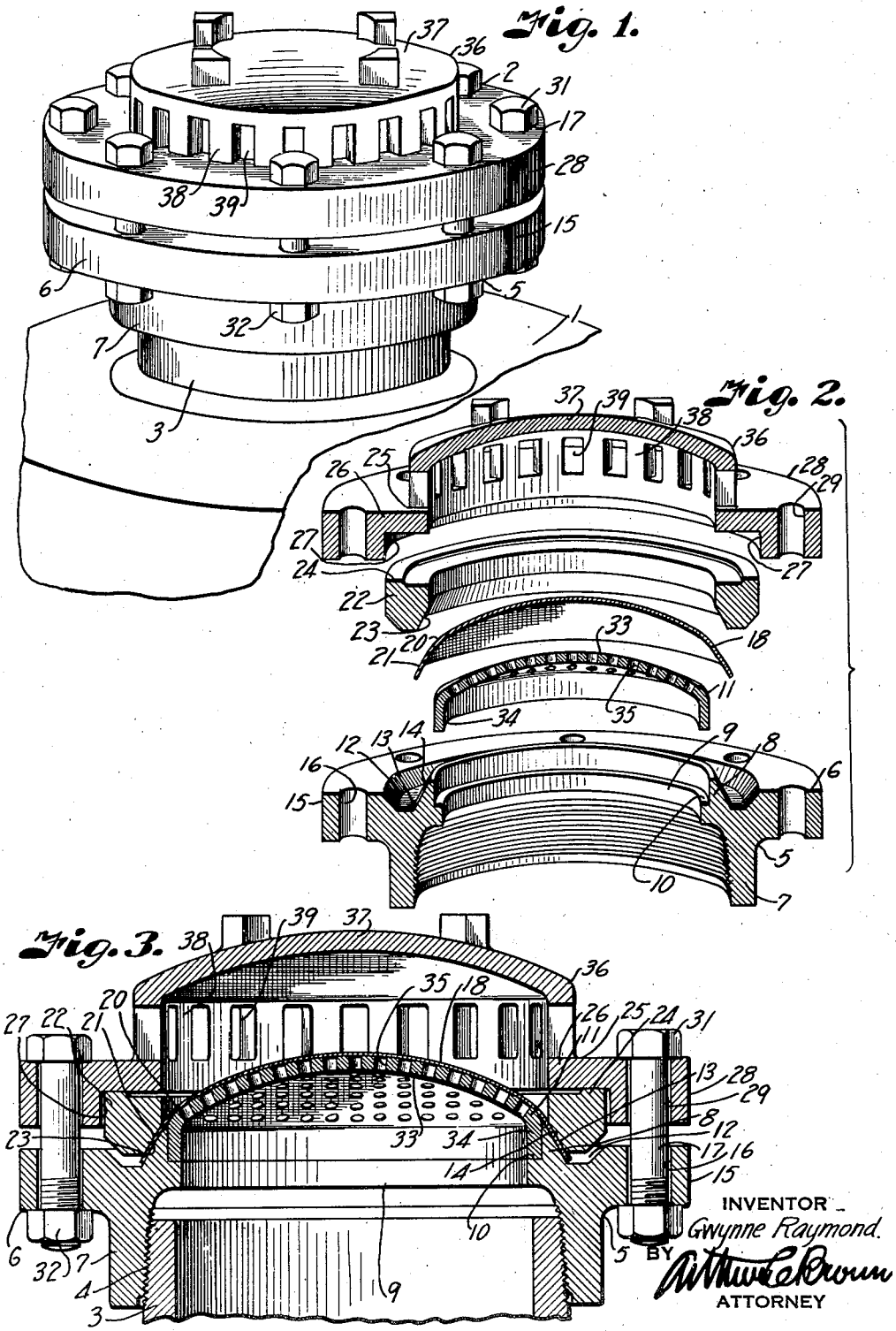
INVENTOR
Gwynne Raymond.
BY
ATTORNEY July 12, 1938.  G. RAYMOND  2,123,662
SAFETY PRESSURE DEVICE
Filed June 17, 1935   2 Sheets-Sheet 2
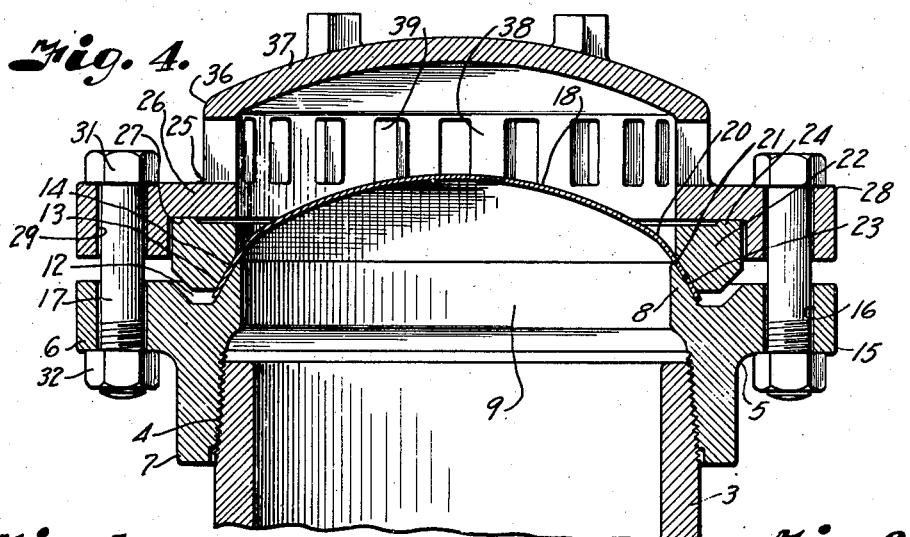
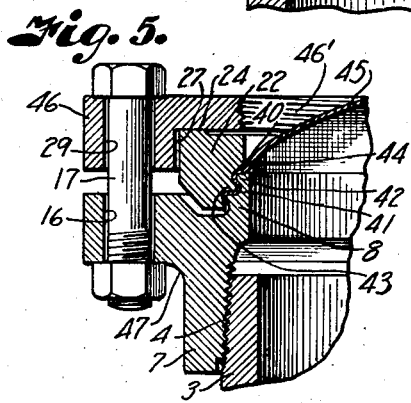
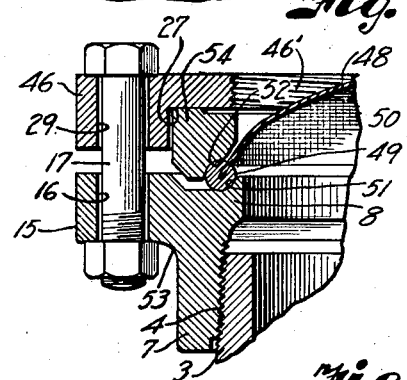
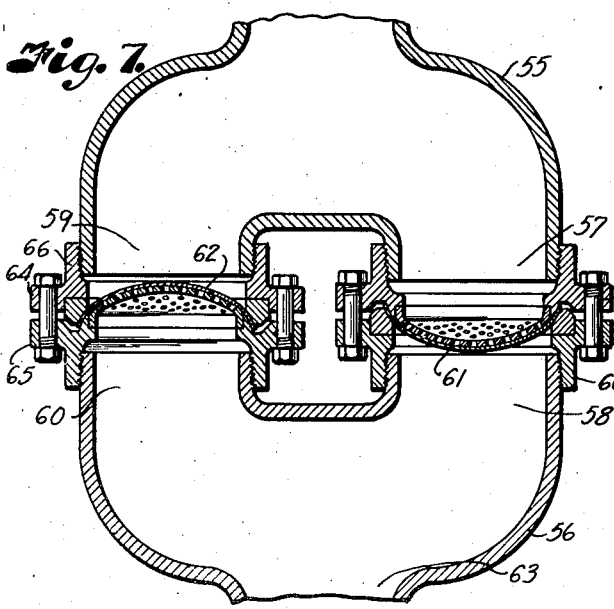
INVENTOR
Gwynne Raymond.
BY
Arthur C. Brown
ATTORNEY

Patented July 12, 1938

2,123,662

UNITED STATES PATENT OFFICE 2,123,662

SAFETY PRESSURE DEVICE

Gwynne Raymond, Oklahoma City, Okla., assignor to Black, Sivalls & Bryson, Inc., Oklahoma City, Okla., a corporation of Maine Application June 17, 1935, Serial No. 27,134

8 Claims. (Cl. 220—89)

This invention relates to safety pressure devices of the frangible diaphragm type for use in connection with fluid systems wherein the contained pressures differ greatly from the external pressures and has for its principal object to provide a relief safety device that will positively actuate when the respective pressure differentials rise above a predetermined value.

Other important objects of the invention are to provide a safety device of this character with means for preventing collapse of the diaphragm in case the system is subjected to greater pressure on the external side of the diaphragm than the pressure on the internal side; to provide improved means for anchoring the diaphragm; and to provide a safety device equipped with dual diaphragms capable of functioning at excessively high and low internal pressures respectively.

In accomplishing these and other objects of the invention, I have provided improved details of structure, the preferred forms of which are illustrated in the accompanying drawings, wherein:

Fig. 1 is a perspective view of a safety device constructed in accordance with the present invention.

Fig. 2 is a vertical section through the respective parts of the safety device shown in disassembled spaced relation.

Fig. 3 is a vertical sectional view through the device in assembled condition.

Fig. 4 is a vertical section through a safety device particularly adapted for use in systems which are not subject to high external pressures.

Fig. 5 is a fragmentary section of a safety device showing a modified form of anchoring the frangible diaphragm.

Fig. 6 is a further modified form of anchorage for the frangible diaphragm.

Fig. 7 is a vertical section through a safety device capable of functioning upon excess differential pressure in either direction.

Fig. 8 is a vertical section through a further modified form of safety device adapted for use in connection with systems subjected to reverse pressures.

Referring more in detail to the drawings:

1 designates a vessel which may be a part of a fluid pressure system that is to be protected with a safety device capable of releasing pressure should the contained pressures greatly exceed the external pressures, or the safe working capacity for which the vessel or system was designed. In the illustrated instance, the safety device 2 is mounted upon a neck flange 3 located at the upper end of the vessel 1 and provided with external threads 4 for mounting a main clamping member 5 of the safety device now to be described.

The main member 5 includes a ring-shaped body 6 having a downwardly depending annular flange portion 7 internally threaded to receive the external threads on the neck flange 3, as best illustrated in Fig. 4. Extending upwardly and inwardly from the flange 6 is a diaphragm seating portion 8 having a central flow opening 9 therein substantially conforming in diameter to the inner diameter of the neck 3 and which, in the illustrated instance, is circumscribed with an inset shoulder 10 for seating a diaphragm supporting member 11 later described.

Formed in the upper portion of the body 6 and circumscribing the seating portion 8 is an annular recess 12 having an upwardly and inwardly inclined side wall 13 extending to the top of the seating portion 8 to form an inclined annular gripping face 14. Extending outwardly from the body portion 6 of the ring is an annular flange having a series of spaced openings 16 through which fastening devices 17 are extended as later described.

Seated upon the annularly inclined gripping face 14 is a safety diaphragm 18, that normally closes the opening 9 but which is adapted to fracture under excessive pressure within the vessel. This diaphragm is formed of a suitable material that may be shaped to form a dome of uniform thickness and capable of fracturing under a predetermined pressure acting against its concave side.

The dome shaped portion 19 of the diaphragm terminates at its periphery by a smoothly rounded annular bend 20, in an outwardly and downwardly flaring flange 21 of suitable diameter and shape to seat snugly against the annular gripping face 14 as clearly shown in Fig. 3 so that there are no sharp break lines on which the diaphragm will tend to fracture.

The dome 19 is thus substantially semi-elliptical in cross section to constitute the frangible portion of the diaphragm and is capable of first failing at the center and then part in radial lines toward the periphery in the manner of an orange peel whenever the predetermined calculated pressure is reached on the concave side thereof. The diaphragm may be constructed to disrupt within very close limits of the predetermined pressure for any diameter of dome by providing material of proper thickness, the tensile strength of the material being considered.

Seated over the outer face of the flange 21 is a retaining ring 22 having its lower face conforming to the contour of the recess 12 and provided with an inclined inner gripping face 23 complementary to the gripping face 14. The inner diameter of the ring 22 is preferably such as to extend to the rounded portion 20 of the diaphragm and has an annular rib 24 on its upper outer periphery to be engaged by an upper clamping member 25. The upper clamping member includes a ring portion 26 conforming in inner diameter with the ring 22 and has a recess 27 on its lower face to accommodate the ring and retain it in central position.

The clamping member 25 includes an outwardly extending flange portion 28 corresponding to the flange 15 of the main clamping member and is provided with openings 29 aligning with the openings 16 to pass fastening devices 17, such as bolts, so arranged that heads 31 engaging against the flange 29 and nuts 32 engaging under the flange 15 draw the clamping members together. Upon drawing the clamping members together the gripping surfaces 14 and 23 are wedged tightly against the flange portion of the diaphragm to retain the normal pressures within the vessel.

While I have described the main and clamping members secured together by bolts, it is obvious that they may be fastened together by other means without departing from the spirit of the present invention.

If the vessel is subject to a greater external pressure than the contained pressure, the diaphragm tends to buckle inwardly incidental to the greater external pressures acting on the outer surface of the diaphragm and in order to overcome this action on the diaphragm, the supporting member, previously mentioned, can be provided to sustain the diaphragm.

The supporting member includes a dome shaped body 33 extending across the flow opening 9 and shaped to closely conform to the inner surface of the diaphragm. The dome shaped body 33 has a depending annular flange 34 that is seated upon the inset shoulder 10 as shown in Fig. 3. To permit the pressure within the vessel to act upon the diaphragm, the dome shaped body of the supporting member is provided with a plurality of apertures 35 wherethrough the pressure is applied directly to the inner surface of the diaphragm. Therefore, when the internal pressures exceed the predetermined value, in relation to the external pressure, the diaphragm disrupts to allow relief of pressure through the opening 9.

In some instances it may be desirable to protect the diaphragm by a cage 36 formed as an integral part of the upper clamping member and which includes a cover portion 37 conforming in shape to and spaced from the diaphragm and an outer annular wall 38 having a series of openings 39 therein of suitable size to permit free relief of the vessel upon functioning of the diaphragm.

The construction illustrated in Fig. 4 is similar to that just described except that the supporting member for the diaphragm is eliminated.

In Fig. 5 is illustrated a fragmentary section of a safety device similar to that illustrated in Figs. 1 to 3 inclusive, but the gripping surfaces 40 and 41 have inter-engaging ribs and grooves 42 and 43 to effect corrugation of the flange 44 of the diaphragm 45 when the upper clamping member 46 is secured to the main clamping member 47.

In the form of the invention shown in Fig. 6 the periphery of the dome shaped diaphragm 48 is provided with a ring 49 that is secured to the edge of the flange 50 thereof and is of substantially circular cross section to conform to grooves 51 and 52 provided in the main clamping member 53 and the retaining ring 54.

In the forms of the invention shown in Figs. 5 and 6, the cage portion of the safety device is eliminated so as to provide a free opening therethrough when the diaphragm bursts under excessive pressures. If desired, the clamping member 46 may be provided with internal threads 46', for connecting an exhaust pipe (not shown).

In Fig. 7 is illustrated a safety device that is adapted to effect relief when the pressure differentials on the respective sides thereof reach certain maximum and minimum values respectively.

In this form of the invention, the safety device includes upper and lower U-shaped fittings 55 and 56 having aligning conduit portions 57—58 and 59—60 between which are inserted frangible diaphragm elements 61 and 62, the dome shaped portion of the diaphragm 61 being arranged reversely to that of the diaphragm 62 so that should the pressures in the fitting 56 exceed the pressures in the fitting 55, the diaphragm 62 will fracture to effect relief of pressure in a vessel or pressure system that may be connected to the inlet 63 of the fitting.

Should the pressure in the fitting 56 drop to a lower predetermined pressure, or should the pressure in the fitting 55 become excessive, the pressures in the fitting 55 will act against the diaphragm 61 to effect bursting thereof to allow relief of pressure in the opposite direction.

The diaphragms 61 and 62 are secured in position by ring-shaped clamping members 64 and 65 similar to the clamping members previously described except that the upper clamping member has an internally threaded flange 66 similar to the threaded flange of the lower member wherewith the U-shaped fittings are secured together.

It is pointed out that the functioning pressures acting on the respective diaphragms need not be the same, for example it might be desirable to have the diaphragm 61 designed to burst under fluid pressure of say twenty pounds per square inch acting on the concave side thereof, whereas the diaphragm 62 may be designed to burst under a fluid pressure of two hundred pounds per square inch acting upon its concave side.

In some cases of excessive differential of pressures, in either direction, it may be desirable to arrange two of the diaphragms in series in reverse relation to each other as illustrated in Fig. 8.

One of the diaphragms 67 is positioned with the dome portion thereof facing in one direction while the dome portion of the diaphragm 68 extends in the opposite direction so that the differential pressures act against their concave sides. Thus a pressure which will blow out the diaphragm 68 will readily reverse and destroy the diaphragm 67.

Diaphragms constructed and anchored as described will function and blow out very close to the calculated pressure differentials for which they are designed so that the system may operate at its highest safe working pressure without danger of the diaphragm giving away, but should safe pressure differentials be exceeded the diaphragms operate to relieve the excess pressure before the bursting pressure in the system is reached.

When the diaphragms fracture they fail through the full opening of the clamping members so that smooth flow and large relief are afforded.

The diaphragms have ample fatigue resistance and are capable of operating at ordinary working pressures over a long period of time, and by use of the inner supporting members, the diaphragms are positively sustained against fatigue in case of pressure reversals and there is no tendency for reversal pressures to alter the final bursting pressure for which the diaphragms were designed.

What I claim and desire to secure by Letters Patent is:

1. A safety pressure device including a dome shaped diaphragm having a downwardly and outwardly flaring peripheral flange formed as a substantially unbroken continuation of the dome portion of said diaphragm so that no defined lines of fracture occur in the juncture of the flange with said dome portion, supporting means for the diaphragm having a flow opening covered by the diaphragm and having a gripping surface encircling the opening substantially corresponding to the inclination of said flaring flange to seat said flange, a retaining ring having a complementary gripping surface engaging the opposite side of said flange, a clamping member having a portion extending over the retaining ring, and fastening devices connecting the clamping member with the diaphragm supporting means.

2. A safety pressure device including a dome shaped diaphragm having a downwardly and outwardly flaring peripheral flange formed as a substantially unbroken continuation of the dome portion of said diaphragm so that no defined lines of fracture occur in the juncture of said flange with said dome portion, supporting means for the diaphragm having a flow opening covering the diaphragm and having a gripping surface encircling the opening substantially corresponding to the inclination of the flaring flange to seat said flange, a retaining ring having a complementary gripping surface engaging the opposite side of said flange, an apertured supporting member having a portion conforming to the shape of the dome portion of the diaphragm to sustain said diaphragm against pressures acting in one direction, a clamping member having a portion engaging the retaining ring, and means securing the clamping member to said supporting means to urge the retaining ring into clamping engagement with the flange of the diaphragm and to retain the apertured supporting member.

3. A safety pressure device including a dome shaped diaphragm having a downwardly and outwardly flaring peripheral flange formed as a substantially unbroken continuation of the dome portion of said diaphragm so that no defined lines of fracture occur in the juncture of the flange with said dome portion, a supporting member for the diaphragm having a flow opening covered by the diaphragm and having a gripping surface encircling the opening substantially corresponding to the inclination of said flaring flange to seat said flange, a retaining ring having a complementary gripping surface engaging the opposite side of said flange, a cap member having a closed top portion spaced from the dome portion of the diaphragm and having radial openings to provide outlets in case of fracturing of the diaphragm, said cap member having an annular recess below said top portion to accommodate the retaining ring, and means securing the cap member on the supporting member to secure the retaining ring in clamping contact with said flange of the diaphragm.

4. A safety device including a main clamping member having an upwardly and inwardly inclined annular gripping surface, a dome-shaped diaphragm having a downwardly and outwardly flaring peripheral flange seated over said gripping surface, a retaining ring having an inclined gripping surface for engaging the outer surface of said diaphragm flange, a clamping ring having a portion extending over a portion of said retaining ring, and means for drawing the clamping ring in the direction of the main clamping member to draw said gripping surfaces into gripping contact with the flange of the diaphragm.

5. A safety device including a main clamping member having an annular recess circumscribing an upwardly and inwardly inclined gripping surface, a dome-shaped diaphragm having a downwardly and outwardly flaring peripheral flange seated over said gripping surface, a retaining ring having a portion extending into said recess and provided with an inclined gripping surface for engaging the outer surface of said diaphragm flange, a clamping ring having a portion extending over a portion of said retaining ring, and means for drawing the clamping ring in the direction of the main clamping member to draw said gripping surfaces into gripping contact with the flange of the diaphragm.

6. A safety device of the character described including a pair of annular clamping members having inclined gripping surfaces, a dome-shaped diaphragm having a downwardly and outwardly flaring peripheral flange engaged between said gripping surfaces, one of said clamping members having an internal annular shoulder inset from one of said gripping surfaces, an apertured dome engaging said dome-shaped portion of the diaphragm to prevent bursting of the diaphragm in one direction and having an annular flange seated on said shoulder to center the apertured dome in close contact with the diaphragm, and fastening means for drawing the clamping members together to retain the diaphragm including said apertured dome.

7. A safety device of the character described including a clamping member having a flow opening therethrough and having a gripping surface encircling said opening, a dome-shaped diaphragm having a flange seated upon said gripping surface, a retaining ring having a gripping surface engaging the opposite face of said flange, a cap member engaging over said retaining ring, a flange on the cap member, and fastening devices extending through the flange on the cap member and engaging the clamping member to draw said gripping surfaces against said diaphragm flange to clampingly retain the diaphragm.

8. A safety device of the character described including a main clamping member having a flow opening therethrough and having a gripping surface encircling said opening, a dome-shaped diaphragm having a flange seated upon said gripping surface, a retaining ring having a gripping surface engaging the opposite face of said flange, a cap member engaging over said retaining ring, a flange on the cap member, fastening devices extending through the flange on the cap member and engaging the main clamping member to draw said gripping surfaces against said diaphragm flange to clampingly retain the diaphragm, and a dome-shaped portion on the cap member extending in spaced relation over the dome-shaped diaphragm and having radial outlet openings whereby forces acting incidental to fracturing of the diaphragm are distributed equally circumferentially of the cap member.

GWYNNE RAYMOND.